US006081568A

United States Patent [19]
Oda

[11] Patent Number: 6,081,568
[45] Date of Patent: Jun. 27, 2000

[54] METHOD AND SYSTEM FOR AUTOMATIC SETTING OF OPTIMUM NUMBER OF WAITING FRAMES IN AUTOMATIC REPEAT REQUEST PROTOCOL

[75] Inventor: Toshio Oda, Tokyo, Japan

[73] Assignee: NEC Corporation, Tokyo, Japan

[21] Appl. No.: 08/845,790

[22] Filed: Apr. 25, 1997

[51] Int. Cl.[7] .................................................... H04L 7/00
[52] U.S. Cl. .......................................... 375/358; 714/750
[58] Field of Search .................................. 714/749, 750, 714/748; 370/517, 519; 375/358

[56] References Cited

U.S. PATENT DOCUMENTS

| | | | |
|---|---|---|---|
| 5,167,035 | 11/1992 | Mann et al. | 714/749 |
| 5,343,480 | 8/1994 | Hasegawa | 714/750 |
| 5,408,507 | 4/1995 | McNamara et al. | 714/749 |
| 5,774,479 | 6/1998 | Lee et al. | 714/749 |

FOREIGN PATENT DOCUMENTS 8-213974  8/1996  Japan .

*Primary Examiner*—Temesghen Ghebretinsae
*Assistant Examiner*—Kevin M Burd

*Attorney, Agent, or Firm*—Foley & Lardner

[57] ABSTRACT

In a data communication system with an automatic repeat request (ARQ) protocol, a method/system capable of setting an optimum value of the RTF, which is used for threshold value of waiting time from transmitting a certain frame until retransmitting the same frame due to no acknowledgement during the waiting time, is provided. During the operation for establishing synchronization, in which a frame for control signal is transmitted repeatedly until receiving acknowledgement from the other end of apparatus, between arbitrary two apparatuses, the transmission delay is detected by using a forward count control information and backward count control information which are newly added in the forward channel information field of the frame format. The forward count control information is incremented by one for every repeated frame, and when the receiving apparatus has received one of the repeated frames, the value of the forward count control information is copied to the backward count control information in a frame to be returned. At the transmission apparatus, when the acknowledgement frame has been received, transmission delay is calculated by subtracting the value of the backward count control information in the received frame from the value of the forward count control information for a frame having been transmitted just before. This subtracted value is used as the RTF.

5 Claims, 6 Drawing Sheets

METHOD AND SYSTEM FOR AUTOMATIC SETTING OF OPTIMUM NUMBER OF WAITING FRAMES IN AUTOMATIC REPEAT REQUEST PROTOCOL

BACKGROUND OF THE INVENTION

1. Field of the Invention

The present invention generally relates to a communication system for transmitting/receiving data in accordance with an automatic repeat request (ARQ) protocol. More specifically, the present invention is directed to a method and a system, capable of automatically setting an optimum number of waiting frames (RTF) defined by that after an arbitrary frame has been transmitted to a receiving apparatus, this arbitrary frame is to be retransmitted due to no response from the receiving apparatus.

2. Description of the Related Art

The number of waiting frames (RTF) in the communication system for transmitting/receiving data based upon the automatic repeat request (ARQ) protocol is the waiting time at a transmission apparatus after a certain frame has been transmitted to a receiving apparatus until this frame is retransmitted due to no response from the receiving apparatus. This is regarded as the transmitted frame having not been received at the receiving apparatus, and this waiting time is calculated as the number of frames to be transmitted normally during the waiting time.

For example, when a communication is established between a transmitting apparatus and a receiving apparatus, and the transmitting apparatus cannot receive a confirmation frame of a certain transmitted frame from the receiving apparatus even after the time equivalent to the transmission time of one frame less than RTF has elapsed, the transmitting apparatus judges that the transmitted frame has not been received by the receiving apparatus. Then, the transmitting apparatus again transmits the same frame to the receiving apparatus.

In this manner, the frame retransmission between the apparatuses A and B is controlled with consideration of transmission delay between two apparatuses.

If the RTF is not suitably set, and it is set shorter than necessary waiting frames, the following protocol failure occurs. That is, the transmitting apparatus transmits a certain frame "n", and then, it is received by the receiving apparatus which will in turn transmit the confirmation frame of the transmitted frame "n". This is normal operation and the receiving apparatus is expecting to receive the next transmitted frame "m" from the transmitting apparatus. However, as the RTF being set in the transmitting apparatus is shorter than a transmission delay between those two apparatuses, the confirmation frame of the transmitted frame "n" from the receiving apparatus does not reach to the transmitting apparatus within a time period defined by the RTF, and it causes the transmitting apparatus to transmit the same frame "n" to the receiving apparatus, although the receiving apparatus is expecting the next frame "m".

Therefore, the fixed value long enough to prevent such protocol failure from ocurring in any combination of apparatuses in the communication network is set for the RTF. The fixed value is decided by considering the maximum transmission delay, including processing time of the protocol at the receiving apparatus and other signal buffering time of the hardware concerned for the communication between arbitrary apparatuses in the communication network, and has usually twice as much as the maximum transmission delay.

Accordingly, conventional technology of a retransmission of frame judged by the fixed value of RTF causes processing delay to increase in the case of data communication between apparatuses having a small value of transmission delay. In such a case, the RTF value is too long to wait for the retransmission of frame considering actual transmission delay between apparatuses. However, if the RTF is set to be a small value in order to reduce the delay in the process operation, protocol failure may occur as the foregoing in certain cases have a long transmission delay between apparatuses.

SUMMARY OF THE INVENTION

The present invention has been made to solve the above-described problems, and therefore, has an object to provide an automatic waiting-frame-number (RTF) setting method/system capable of automatically setting an optimum value of the RTF.

To achieve the object, a method of automatic setting of an optimum number of waiting frames (RTF) in a data communication network employing a automatic repeat request (ARQ) protocol in which synchronization establishment signaling phase and actual data transmission signaling phase exist, the method comprises the following steps:

(1) detecting transmission delay time between a transmission apparatus and a reception apparatus by using repeated frames during the synchronization establishment signaling phase; and (2) using the transmission delay time for a threshold value of waiting time from transmitting a certain frame until retransmitting the same frame due to no acknowledgement from the other end of apparatus in the actual data transmission signaling phase.

In the present invention, the transmission delay time is calculated by attaching a forward count control information in a frame to be transmitted from a transmission apparatus during a synchronization establishment phase of signaling, incrementing a value of the forward count control information by one for every frame being transmitted repeatedly during the synchronization establishment phase of signaling until receiving an acknowledgement, copying the value of the forward count control information attached in a received frame at a reception apparatus to a backward count control information to be attached to an acknowledgement frame.

The acknowledgement frame is sent back from the reception apparatus to the transmission apparatus, and the value of the backward count control information in the received frame at the transmission apparatus is subtracted from the value of the forward count control information for a frame having been transmitted just before.

Also, a system of automatic setting of an optimum number of waiting frames (RTF) in a data communication network employing a automatic repeat request (ARQ) protocol according to the present invention comprises first number allocating means for allocating sequential numbers to each frame to be transmitted repeatedly from a transmission apparatus, second number allocating means for copying a sequential number allocated to a frame having been received from the transmission apparatus at a reception apparatus, and allocating the copied number to a frame to be returned to the transmission apparatus from the reception apparatus as an acknowledgement frame.

The system also comprises control means for calculating transmission delay time between the transmission apparatus and the reception apparatus by subtracting the value of the sequential number allocated to the acknowledgement frame from the value of the sequential number allocated to a frame having been transmitted just before from the transmission apparatus, and using the transmission delay time for a threshold value of waiting time counted by a number of frames from transmitting a certain frame until retransmitting the same frame due to no acknowledgement during the waiting time in the actual data transmission signaling phase.

BRIEF DESCRIPTION OF THE DRAWINGS

A more complete understanding of the present invention may be achieved by reading the detailed descriptions in conjunction with the accompanying drawings, in which.

DETAILED DESCRIPTION OF THE PREFERRED EMBODIMENTS

Referring to drawings, a description will be made of a method/system for automatically setting an optimum number of frames in an automatic repeat request (ARQ) protocol, according to various preferred embodiments of the present invention.

There are two signaling phases in data communication based upon the automatic repeat request (ARQ) protocol. One is the signaling phase of synchronization establishment between transmitting apparatus and receiving apparatus prior to the following signaling phase, and another is the signaling phase of actual data transmission and reception between those apparatuses.

In the signaling phase of synchronization establishment, a frame containing control information for establishing synchronization is transmitted repeatedly until receiving an acknowledgement from the other end of the apparatus. This is due to an unstable state until synchronization is established and increasing possibility of reception of the signal in such an unstable state. Once synchronization has been established, each frame containing control information and data is transmitted one by one with an acknowledgement of each frame from the other end of the apparatus, and the RTF is used in this signaling phase of actual data transmission and reception.

First of all, the conventional sequential operation of the signaling phase of synchronization establishment by the ARQ protocol will be described with reference to FIG. 5 and FIG. 6.

Figure 5:
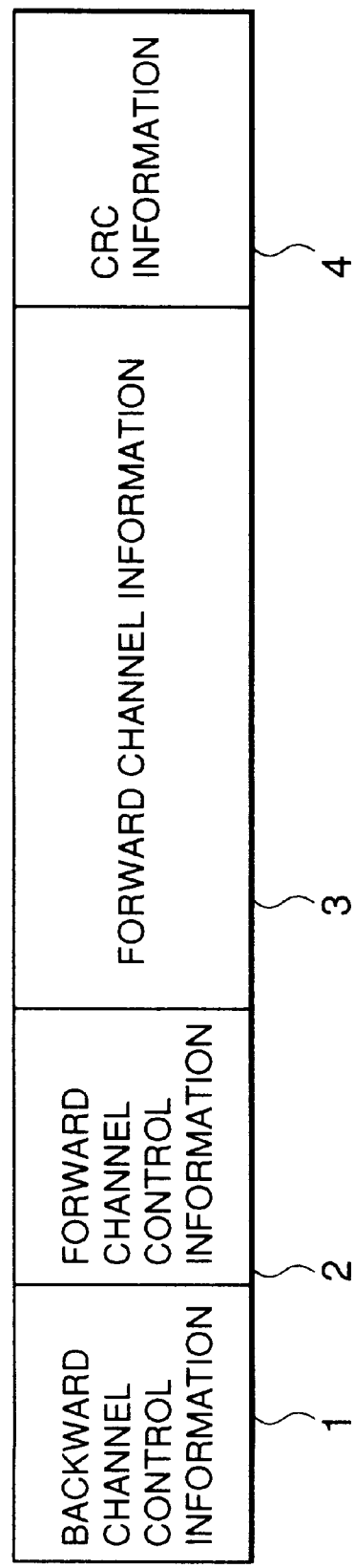
FIG. 5 shows the frame format of the transmission/reception data used in the automatic repeat request protocol in the conventional system.
Figure 6:
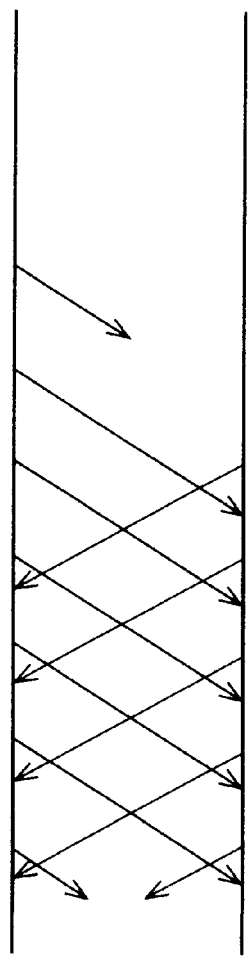
FIG. 6 represents the sequential operation up to the establishment of synchronization in the conventional system.

FIG. 5 represents a conventional frame format of the ARQ protocol and FIG. 6 is the sequence chart of the ARQ protocol between apparatuses A and B in the signaling phase of synchronization establishment.

In FIG. 5, the field 2 is the forward channel control information in which the transmission frame number "N(S)" is allocated to the transmission frame by the transmitting apparatus A to notify the frame number of the transmitted frame to the receiving apparatus B. The field 1 is the backward channel control information in which acknowledgement signal such as "ACK (positive acknowledgement)" or "NACK (negative acknowledgement)" and the reception frame number "N(R)", which is the same number as the transmission frame number "N(S)" attached to the transmitted frame received from the apparatus A, are set by the reception apparatus B. The field 3 is used for setting data or information to be transmitted, and the field 4 is the CRC information.

As represented in FIG. 6, in the sequential operation for establishing the synchronization between the apparatus A and the apparatus B for terminating frames by the ARQ protocol, as the process operation on the apparatus A, the transmission mode "SR" and the transmission frame number "N(S)=0" are set in the field of the forward channel control information of the transmitted frame. This frame is transmitted repeatedly from the apparatus A. When one of the frames transmitted repeatedly is received by the apparatus B, and transmission mode "SR" and the transmission frame number "N(S)=0" as the forward channel control information are recognized, the apparatus B sets the positive acknowledgement "ACK" and the reception frame number "N(R)=0" to the field of the backward channel control information of the frame to be transmitted from the apparatus B. Apparatus A then transmits the set information to the apparatus A. This frame is also transmitted repeatedly from the apparatus B. When the apparatus A receives one of the frames transmitted repeatedly from the apparatus B and recognizes "ACK" and the reception frame number "N(R)=0", the apparatus A judges that the synchronization can be established.

In the present invention, an optimum value of the RTF for each data communication is decided by utilizing this signaling sequence of synchronization establishment performed in advance of actual data communication phase.

Figure 1:
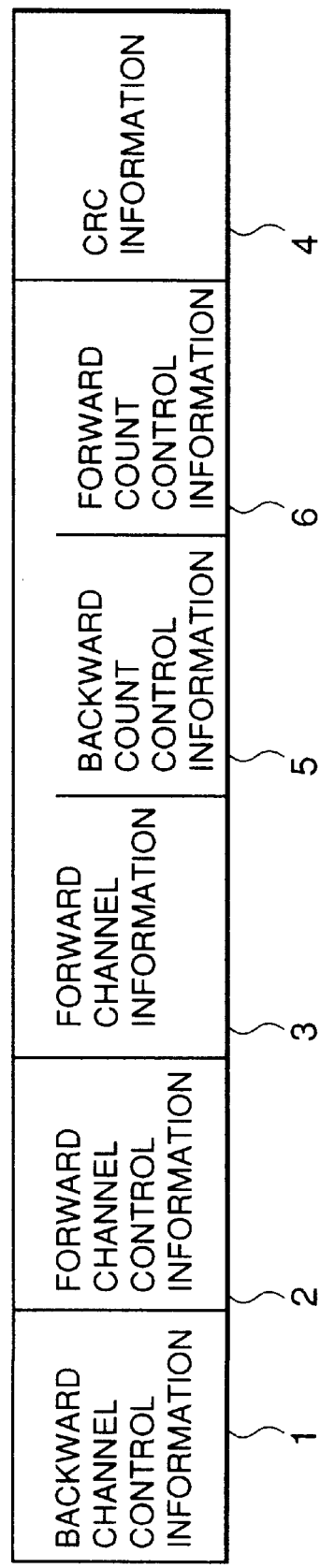
FIG. 1 schematically shows a frame format of transmission/reception data according to the present invention.
Figure 2:
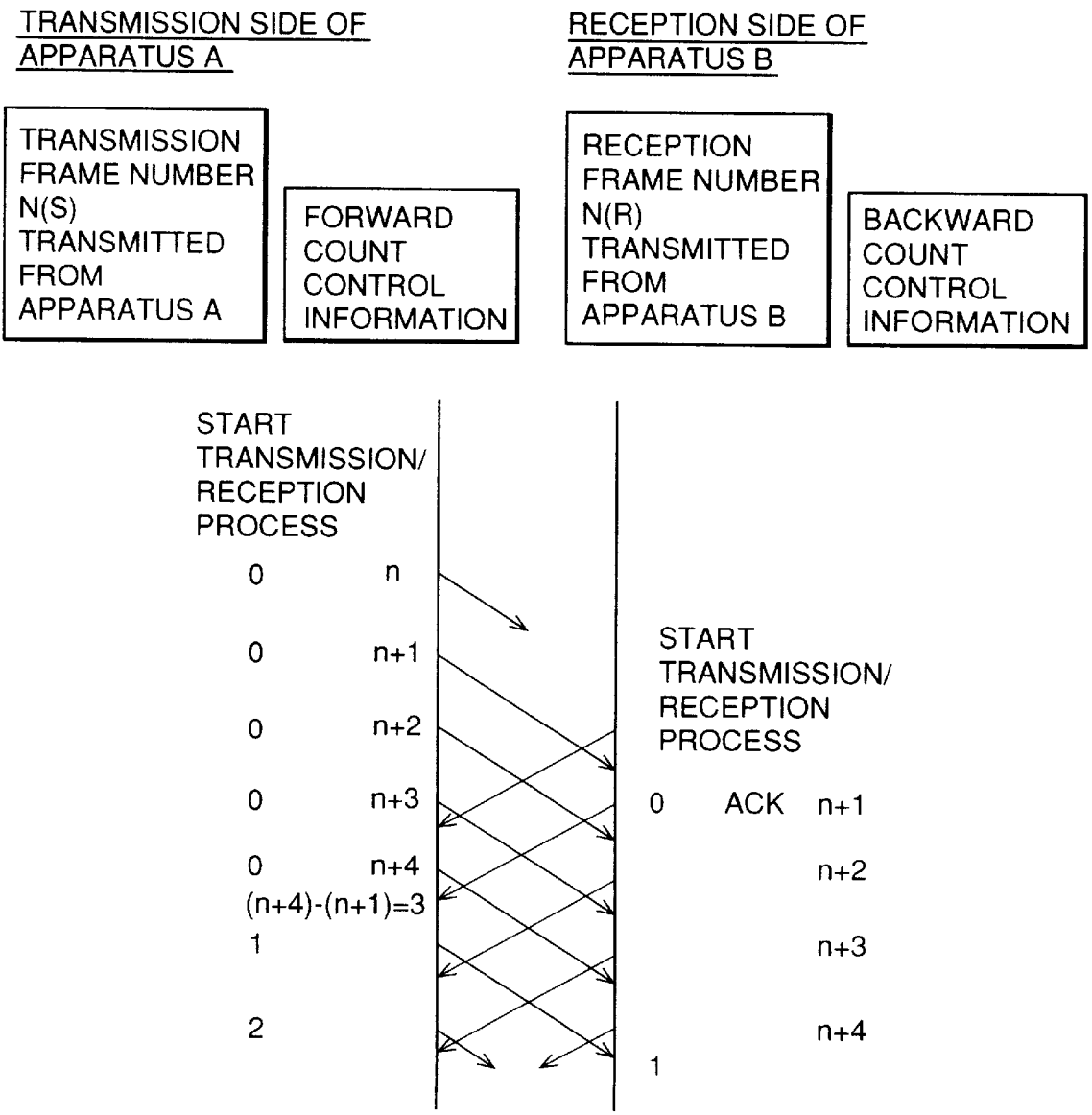
FIG. 2 is a sequential operation according to the present invention for schematically explaining operations up to an establishment of synchronization when no CRC error is present.
Figure 3:
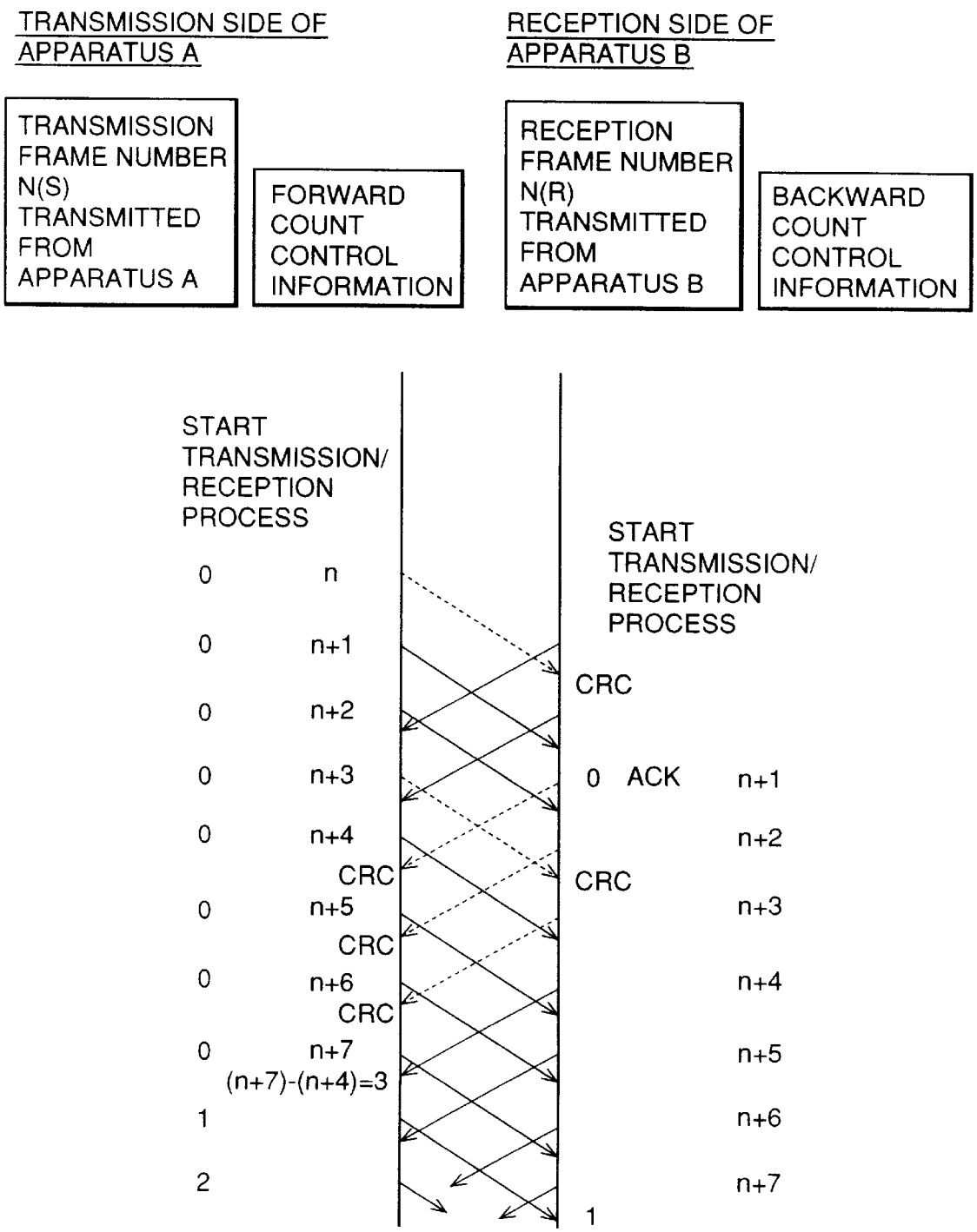
FIG. 3 is a sequential operation according to the present invention for schematically explaining operations up to the establishment of synchronization when there is a CRC error.

FIG. 1 schematically represents a frame format of a transmission/reception data used in an automatic setting method/system of an optimum number of waiting frames in an automatic repeat request (ARQ) protocol, according to the present invention. In this frame format, backward channel control information (reference numeral 1), forward channel control information (reference numeral 2) and CRC information (reference numeral 4) are the same as those shown in the frame format of FIG. 5. However, in the present invention, forward channel information (reference numeral 3) includes backward count control information (reference numeral 5) and forward count control information (reference numeral 6) which will be described later. FIG. 2 illustrates a sequential operation of synchronization establishment with no CRC error being detected during a signaling sequence according to the present invention. FIG. 3 illustrates another sequential operation of synchronization establishment with a CRC error being detected during a signaling sequence.

Referring now to FIG. 2, the sequential operation about the establishment of synchronization with no CRC error being detected during signaling sequence will be described.

That is, in the sequential operation for establishing a synchronization between an apparatus A and another apparatus B for terminating an ARQ protocol, the apparatus A executes the following transmission process.

The apparatus A prepares the frame to be transmitted to the apparatus B by setting a transmission mode "SR" and a transmission frame number "N(S)=0" in the forward channel control information, and in addition to this, the forward count control information "n" in the forward channel information. This frame is transmitted repeatedly until an acknowledgement frame is returned from the apparatus B as in the foregoing explanation. The forward count control information "n" indicates each count number of the repeated frame, and it is incremented by 1 every time the transmission of the frame is repeated.

On the reception side of the apparatus B, when one of the repeated frames is received, and the transmission mode "SR" and the transmission frame number "N(S)=0" are recognized in the forward channel control information, an ACK (positive acknowledgement) and a reception frame number "N(R)=0", which is copied by the received transmission frame number "N(S)=0", are set to the backward channel control information in the frame to be returned as acknowledgement. Furthermore, the backward count control information is also set in the frame with the following manner. The counting value of the forward count control information in the transmitted frame, of which the apparatus B has recognized the reception, is copied to the backward count control information in the frame to be returned as an acknowledgement. Therefore, if assuming that one of the repeated frames having its forward count control information of "n+1", as shown in FIG. 2, from the apparatus A has been received by the apparatus B and recognized, the value of the backward count control information to be set in the returning frame is to be "n+1". Then, the acknowledgement frame having the set of information is transmitted to the apparatus A. Transmission of this acknowledgement frame is also repeated until the apparatus B receives the following frame having the transmission number "N(S)=1" from the apparatus B, and the backward count control information is incremented by 1 for every repeating frame.

Next, when the apparatus A receives the acknowledgement frame transmitted from the apparatus B including "ACK" and the reception frame number "N(R)=0" in the backward channel control information, the apparatus A transmits the next frame having the transmission frame number "N(S)=1" in the forward channel control information. In this apparatus A, a count value difference between the backward count control information ("n+1" in FIG. 2) set in the reception frame (acknowledgement frame) at this time, and the forward count control information ("n+4" in FIG. 2) set in the latest repeated transmission frame becomes a delay frame number ("3" in FIG. 2). This delay frame number is calculated as an optimum number of frames to be waiting (RTF) due to transmission delay between those apparatuses A and B. Then, on the transmission side of the apparatus A, the ordinary ARQ protocol process operation is executed. On the reception side of the apparatus B, when the frame having the transmission frame number "N(S)=1" in the forward channel control information is received, the normal ARQ protocol process operation is executed. A similar process operation is carried out also on a transmission side of the apparatus B, and a reception side of the apparatus A, so that the apparatus A and the apparatus B calculate RTFs, respectively, to execute the signaling process operation by the ordinary ARQ protocols which is followed by the signaling process operation of the synchronization establishment.

Referring now to FIG. 3, the sequential operation about the establishment of synchronization with CRC error being detected during signaling sequence will be described.

Main sequential operations in the apparatus A and the apparatus B are the same as those described for the sequential operations of FIG. 2.

That is, the apparatus A executes the following transmission process:

- a transmission mode "SR" and a transmission frame number "N(S)=0" are set in the forward channel control information of the frame to be transmitted;
- the forward count control information "n" is set in the forward channel information;
- the frame is transmitted to the apparatus B;
- the transmission of the frame is repeated until the acknowledgement frame is returned from the apparatus B; and
- the count value being set in the forward count control information is incremented by 1 for every repeating frame.

Also, the apparatus B executes the following transmission process:

- a transmission mode "SR" and a transmission frame number "N(S)=0" in the received frame are recognized and the "ACK" (positive acknowledgement) and a reception frame number "N(R)=0" are set in the backward channel control information of the acknowledgement frame;
- the value of the forward count information of the transmitted frame is copied and set to the backward count control information in the backward channel information;
- the acknowledgement frame is transmitted to the apparatus A;
- the transmission of the acknowledgement frame is repeated until the next frame having the transmission frame number "N(S)=1" is transmitted from the apparatus A; and
- the count value being set in the backward count control information is incremented by 1 for every repeating frame.

Now, it is assumed that the CRC error is detected in the transmitted frame having the forward count control information "n" at the apparatus B but the next frame having the forward count control information "n+1" is received normally.

Then, the forward count control information "n+1" in the received frame is copied to the backward count control information in the acknowledgement frame with "ACK" and "N(R)=0" in the backward channel control information, which is to be transmitted to the apparatus A from the apparatus B. Subsequently, the apparatus B repeats the transmission of the acknowledgement frame until the frame having the transmission frame number "N(S)=1" is received, and the value of the backward count control information in each repeated frame is incremented by 1 for every repeated frame.

Again, it is assumed that the CRC error is detected in each acknowledgement frame having the backward count control information "n+1", "n+2" and "n+3" at the apparatus A but the next frame having the backward count control information "n+4" is received normally.

When the apparatus A recognizes the "ACK" and the reception frame number "N(R)=0" as the backward channel control information, the apparatus A transmits the next transmission frame having the transmission frame number "N(S)=1" in the forward channel control information. In this apparatus A, a count value difference between the backward count control information ("n+4" in FIG. 3) set in the reception frame (acknowledgement frame) at this time, and the forward count control information ("n+7" in FIG. 3) set in the latest repeated transmission frame becomes a delay frame number ("3" in FIG. 3). This and this delay frame number is calculated as an optimum number of frames to be waiting (RTF) due to transmission delay between those apparatuses A and B. Then, on the transmission side of the apparatus A, the ordinary ARQ protocol process operation is executed. On the reception side of the apparatus B, when the frame having the transmission frame number "N(S)=1" in the forward channel control information is received, the normal ARQ protocol process operation is executed. A similar process operation is carried out also on a transmission side of the apparatus B, and a reception side of the apparatus A, so that the apparatus A and the apparatus B calculate RTFs, respectively, to execute the signaling process operation by the ordinary ARQ protocols which is followed by the signaling process operation of the synchronization establishment.

As apparent from the foregoing descriptions, the RTFs having the same values are obtained even in the synchronization establishing sequence with no CRC error, and also in the synchronization establishing sequence with the CRC error. As a result, the optimum number of waiting frames (RTF) can be set in the signaling phase of the synchronization establishment.

It should be noted that although both the backward count control information and the forward count control information are present on the frame format as a portion of the forward channel information, the present invention is not limited to this position.

Figure 4:
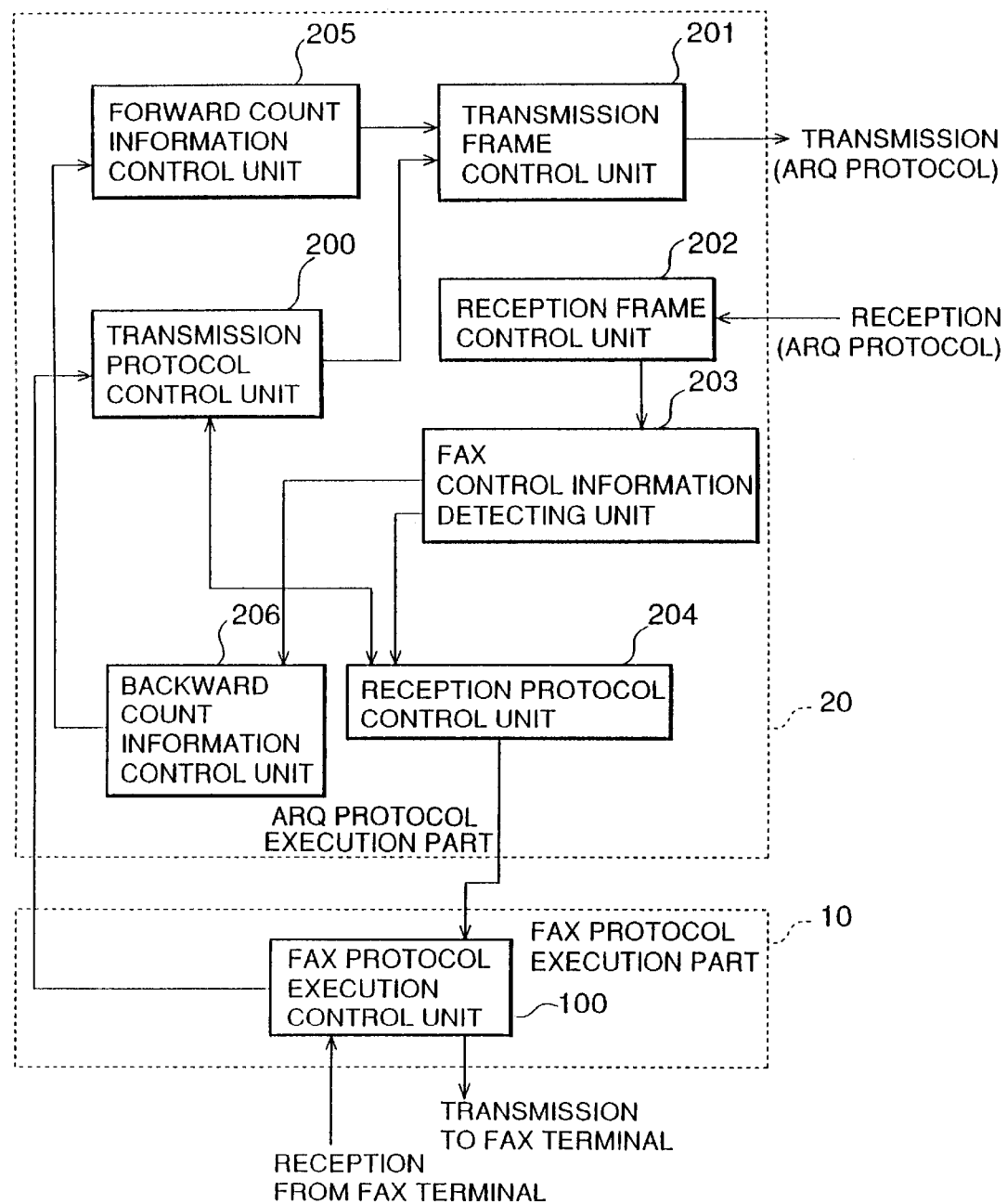
FIG. 4 is a schematic block diagram for representing the automatic setting system for the optimum number of waiting frames in the automatic repeat request protocol, according to the present invention.

Referring now to FIG. 4, operations of the system of automatic setting for the optimum number of waiting frames, according to the present invention, will be explained.

FIG. 4 is a schematic block diagram for representing the system of automatic setting for the optimum number of waiting frames according to the present invention. This system can be applied to a facsimile (FAX) terminal to be used in conjunction with a mobile terminal in the mobile communication network.

The FAX communication in the mobile communication network employs the ARQ protocol. During a connection establishing phase (FAX communication phase B), several control information are transmitted and received between a transmitting FAX terminal and a receiving FAX terminal, and a signal frame containing control information is transmitted repeatedly until an acknowledgement frame is received from the other end of the FAX terminal. This is done to secure the signal reception of control information, because one of the repeated frames can be received even when a mobile terminal goes through a bad radio transmission condition area, such as a shadow area of a large building or mountain. Once connection has been established, picture signals are transmitted one by one with each confirmation frame from the receiving FAX terminal, and this signaling phase is called the FAX communication phase C and the RTF is used for retransmission of a frame. That is, if no confirmation frame is transmitted from the other end of the FAX terminal within the RTF, the transmission FAX terminal retransmits the same frame to the receiving FAX terminal.

In this system of FIG. 4, the FAX protocol execution part 10 is connected to the mobile FAX terminal (not shown in the figure) and executes the FAX protocol control by the FAX protocol execution control unit 100 between the FAX terminal in the other end (not shown in the figure). The ARQ protocol execution part 20 is connected to the FAX protocol execution part 10 and execute the ARQ protocol control which will be transmitted and received by radio signals.

The ARQ protocol execution part 20 comprises the following units:

a transmission protocol control unit 200 for assembling a transmission frame format according to the ARQ transmission protocol;

a transmission frame control unit 201 for transmitting the frame assembled by the transmission protocol control unit 200 in a predetermined time interval;

a receiving frame control unit 202 for receiving returned frames transmitted from the receiving terminal;

a receiving protocol control unit 204 for processing information contained in a frame transmitted from the receiving terminal in accordance with a receiving protocol;

a FAX control information detecting unit 203 for detecting the FAX control information in a frame transmitted from the receiving terminal;

a forward count information control unit 205 for controlling forward count information; and a backward count information control unit 206 for controlling backward count information.

In a transmission side of the apparatus, when a transmission request for a FAX control signal (e.g. "DIS" signal or "DCS" signal) is issued by the FAX protocol execution control unit 100, this transmission request is received by the transmission protocol control unit 200 which then activates the transmission frame control unit 201 to instruct a transmission of a frame including the FAX control signal. also activates the forward count information control unit 205 for setting the forward count information in the forward channel information field of the frame to be transmitted. The forward count information control unit 205 instructs the transmission frame control unit 201 to include the forward count control information of a numeral value "n" in the forward channel information of the transmission frame having a transmission frame number of N(S)=K. This numeral value "n" as the forward count control information is incremented by one for every repeated frame until the next transmission frame having the transmission frame number of N(S)=K+1 is to be transmitted.

In a reception side of the apparatus, when the frame transmitted from the transmission side of the apparatus is received by the reception frame control unit 202, the frame is transferred to the FAX control information detecting unit 203 which then detects the FAX control signal contained in the frame and transfers this signal to the FAX protocol execution control unit 100 through the reception protocol control unit 204. The FAX control information detecting unit 203 also transfers the received frame to the backward count information control unit 206.

The reception protocol control unit 204 performs the following operations for returning an acknowledgement frame to the transmission side of the apparatus:

extracts the transmission frame number N(S)=K from the frame having been received;

copies the number "K" and produces the reception frame number N(R)=K;

provides ""ACK" (positive acknowledgement)" in a forward channel information of a frame to be returned; and instructs the transmission protocol control unit 200 to transmit the acknowledgement frame.

The backward count information control unit 206 copies the numeral value of the forward count control information contained in the frame, having been received, to the numeral value of the backward count control information, and then instructs the forward count information control unit 205 to include this numeral value in a frame to be returned as an acknowledgement.

The transmission protocol control unit 200, instructed by the reception protocol control unit 204 for returning the acknowledgement frame, activates the forward count information control unit 205 for adding the backward count information to the frame to be returned. The forward count information control unit 205 instructs the transmission frame control unit 201 to include the backward count control information of the numeral value, transferred from the backward count information control unit 206, in the forward channel information of the acknowledgement frame indicated by the "ACK". The numeral value of the backward count control information is incremented by one for every repeated frame until the next frame having the frame number of N(R)=K+1 is to be returned.

Next, an explanation will be made for the operations in the transmission side of apparatus which has received the acknowledgement frame from the reception side of the apparatus.

The acknowledgement frame transmitted from the reception side of the apparatus is received by the reception frame control unit 202, and transferred to the FAX control information detecting unit 203. When the FAX control information detecting unit 203 detects the "ACK", this signal is transferred to the FAX protocol execution control unit 100 through the reception protocol control unit 204. Also the reception frame is transferred to the backward count information control unit 206 from the FAX control information detecting unit 203.

The reception protocol control unit 204, which has acknowledged the reception of the ACK signal from the FAX control information detecting unit 203, only repeats the signal to the FAX protocol execution control unit 100, but performs no other specific operation.

The backward count information control unit 206, which has acknowledged the reception of the ACK signal from the FAX control information detecting unit 203, extracts the backward count control information included in the frame, and transfers this extracted information together with the report that the ACK signal has been received to the forward count information control unit 205.

The forward count information control unit 205 calculates the transmission delay by the difference of numeral values between the backward count control information which just has been received and the forward count control information which has been attached to the repeated frame transmitted just before, and decides the value of RTF to be used for the FAX communication protocol phase C in this connection.

As described in detail, the automatic setting method/system of the optimum number of waiting frames in the automatic repeat request protocol according to the present invention owns the following advantages. That is, in the system for transmitting/receiving the data by way of the automatic repeat request (ARQ) protocol, the optimum value of the number of waiting frames (RTF) can be calculated during the operation by which synchronization is established between the arbitrary apparatuses which will communicate with each other. As a consequence, the data communication can be performed with high efficiency while suppressing the process delay to the minimum delay.

Although the present invention has been fully described by way of the preferred embodiments thereof with reference to the accompanying drawings, various changes and modifications will be apparent to those having skill in this field. Therefore, unless these changes and modifications otherwise depart from the scope of the present invention, they should be construed as included therein.

What is claimed is:

1. A method for automatically setting of an optimum number waiting frames (RTF) in a data communication network employing an automatic repeat request (ARQ) protocol, said method comprising the steps of:

attaching a forward count control information in a frame to be transmitted from a transmission apparatus during a synchronization establishment phase of signaling;

incrementing a value of the forward count control information by one for every frame being transmitted repeatedly during the synchronization establishment phase of signaling until receiving an acknowledgement;

copying the value of the forward count control information attached in a received frame at a reception apparatus to a backward count control information to be attached to an acknowledgement frame;

sending back the acknowledgement frame from the reception apparatus to the transmission apparatus; and subtracting the value of the backward count control information in the received frame at the transmission apparatus from the value of the forward count control information for a frame having been transmitted just before.

2. A method as in claim 1, further comprising a step of:

using said subtracted value for a threshold value of waiting time from transmitting a certain frame until retransmitting the same frame due to no acknowledgement from the other end of the apparatus in the actual data transmission signaling phase.

3. A method as in claim 1, further comprising a step of:

incrementing the value of the backward count control information by one for every frame being transmitted repeatedly during the synchronization establishment phase of signaling until receiving a next transmission frame from the transmission apparatus.

4. A method as in claim 3, further comprising a step of:

using said subtracted value for a threshold value of waiting time from transmitting a certain frame until retransmitting the same frame due to no acknowledgement during the waiting time in the actual data transmission signaling phase.

5. A system for automatically setting an optimum number of waiting frames (RTF) in a data communication network employing an automatic repeat request (ARQ) protocol in which a synchronization establishment signaling phase and an actual data transmission signaling phase exist, said system comprising:

a first number allocating unit for allocating sequential numbers to each frame to be transmitted repeatedly from a transmission apparatus;

a second number allocating unit for copying a sequential number allocated to a frame having been received from the transmission apparatus at a reception apparatus, and allocating the copied number to a frame to be returned to the transmission apparatus from the reception apparatus as an acknowledgment frame; and a control unit for calculating a transmission delay time between the transmission apparatus and the reception apparatus by subtracting the value of the sequential number allocated to the acknowledgment frame from the value of the sequential number allocated to a frame having been transmitted just before from the transmission apparatus, and using the transmission delay time for a threshold value of waiting time counted by a number of frames from transmitting a certain frame until retransmitting the same frame due to no acknowledgment during the waiting time in the actual data transmission signaling phase.

* * * * *